United States Patent [19]

Stern

[11] Patent Number: 5,026,735
[45] Date of Patent: Jun. 25, 1991

[54] TREATMENT OF HAZARDOUS MATERIALS WITH AQUEOUS AIR FOAM OF POLYHYDROXY POLYMER

[75] Inventor: Richard M. Stern, St. Paul, Minn.

[73] Assignee: Minnesota Mining and Manufacturing Company, St. Paul, Minn.

[21] Appl. No.: 537,049

[22] Filed: Jun. 12, 1990

Related U.S. Application Data

[63] Continuation of Ser. No. 204,110, Jun. 8, 1988, abandoned.

[51] Int. Cl.$^5$ .................................................. C08J 9/06
[52] U.S. Cl. ........................................ 521/50; 521/65; 521/68; 521/69; 521/70; 521/78; 521/84.1; 521/85; 521/135; 521/907; 521/913; 521/921; 252/3; 252/8.514; 252/315.3; 252/626; 252/628; 252/631; 210/751
[58] Field of Search ................... 521/50, 65, 68, 69, 521/70, 78, 84.1, 85, 135, 907, 913, 921; 252/3, 8.514, 315.3, 626, 628, 631; 210/751

[56] References Cited

U.S. PATENT DOCUMENTS

| | | | |
|---|---|---|---|
| 3,264,245 | 8/1966 | Sinclair et al. | 260/29.6 |
| 3,794,115 | 2/1974 | Skagerberg | 166/294 |
| 4,021,355 | 5/1977 | Holtmyer et al. | 252/8.55 R |
| 4,568,481 | 2/1986 | Harris | 252/315.3 |
| 4,579,942 | 4/1986 | Brode et al. | 536/84 |
| 4,795,590 | 1/1989 | Kent et al. | 252/307 |
| 4,795,764 | 1/1989 | Alm et al. | 521/107 |

FOREIGN PATENT DOCUMENTS 206548A 12/1986 European Pat. Off. .
3230259 2/1984 Fed. Rep. of Germany .
7593879 7/1975 Japan .

OTHER PUBLICATIONS

The Wall Street Journal, May 16, 1985, pp. 1-20.
Consulting Engineer, Mar. 1984, pp. 35-47.
U.S. Defensive Publication T901,022, published in PTO Official Gazette, 901 O.G. 416.
Encyclopedia of Chem. Tech., Kirk-Othmer, 3rd Edition, vol. 22, pp. 347-387, John Wiley & Sons (1983).
Handbook of Water-Soluble Gums & Resins, R. L. Davidson, McGraw Book Co. (1988) Chaps. 6 and 20.
E. Z. Casassa, et al., J. of Chem. Ed., 63, 57-60.

Primary Examiner—Morton Foelak
Assistant Examiner—S. A. Acquah
Attorney, Agent, or Firm—Gary L. Griswold; Walter N. Kirn; Eloise J. Maki

[57] ABSTRACT

A method of treating hazardous material or other substrate with an aqueous air foam, comprising the steps of (1) preparing an aqueous solution or dispersion comprising (a) water-soluble polyhydroxy polymer having a plurality of hydrogen-bondable 1,2- and/or 1,3-diol structures capable of complexation with the borate anion, $B(OH)_4^-$, (b) polyvalent ionic complexing agent, such as borax, which crosslinks said polymer by hydrogen-bonding complexation, (c) foaming agent to impart persistence to the fluid air foam generated upon aeration of said solution or dispersion, (d) a pH modifier, such as sodium hydroxide or acetic acid, to impart an appropriate pH to the solution or dispersion necessary for time-controlled formation of gelled or viscous air foam from the fluid air foam, and (e) water as the major component of said aqueous solution or dispersion by weight; (2) aerating said aqueous solution or dispersion to form therefrom a fluid, aqueous, aerated or air-entrained, low density foam (or air foam) which is gelable or becomes viscous, generally at least 5 seconds after its formation; and (3) spraying, contacting or otherwise applying said fluid, aqueous air foam to exposed surface of said hazardous material or other substrate.

21 Claims, No Drawings

TREATMENT OF HAZARDOUS MATERIALS WITH AQUEOUS AIR FOAM OF POLYHYDROXY POLYMER

This is a continuation of application Ser. No. 07/204,110 filed June 8, 1988, now abandoned.

This invention relates to water-based compositions comprising water-soluble polyhydroxy polymer, such as guar gum or poly(vinyl alcohol). In another aspect, it relates to the treatment of hazardous materials and other substrates, such as those in hazardous waste sites, with water-based air foams. In another aspect, it relates to water-based air foams and to their use in such treatment.

During recent years the threat of hazardous wastes, hazardous spills, leaks, and accidents of flammable liquids, and other hazardous materials to public health and safety and to the environment has received increasing attention and raised national concerns and issues which are being addressed by a host of local ordinances and state and federal laws and regulations (see, for example, "In the Dumps", *The Wall Street Journal*, May 16, 1985, pages 1, 20). Various technologies have been used or proposed for the treatment or control of such materials (see, for example, *Consulting Engineer*, Mar., 1984, pages 35–47).

There are thousands of hazardous waste sites in the United States, such as impoundments, burial dump sites, and landfills in which wastes from industrial and commercial operations, research and retail establishments, educational and hospital laboratories, and military complexes have been stored or disposed. Such sites are either still operating, inactive, or abandoned and the emission or release of gases, vapors, odors, liquids, and dust from such sites and their pollution of the air and surface or ground water and contamination of soil are uncontrolled or are controlled or managed by various techniques many of which have disadvantages which limit their applicability.

An example of a particularly serious hazardous waste dump is the McColl Dump in Orange County, Calif., an abandoned World War II dump containing acid petroleum sludges, oil field drilling muds, waste hydrocarbons, sulfur dioxide, and benzene, which dump is in close proximity to a residential area of more than 800 homes. A cleanup solution proposed for that site is excavation of the hazardous waste material by workers in protective clothing and hauling by trucks of the excavated material elsewhere, with the possible evacuation of people from the neighborhood if emissions of gases and odors cannot be controlled.

A significant advance in the treatment of hazardous material is that described in European Patent Application, EP 206548A, published Dec. 30, 1986. That application discloses aerating an aqueous solution of surfactant and poly(oxyalkylene)isocyanate prepolymer, prepared from polyether polyols and polyisocyanates, to form a fluid, water-based air foam which is sprayed or otherwise applied to the exposed surface of a substrate, such as a body of hazardous material, the applied foam gelling or increasing in viscosity, due to the reaction of the isocyanate prepolymer with water to form a poly(oxyalkylene) polyurea polymer, and forming a persistent, gelled air foam or viscous air foam in the form of a coating on the exposed surface, thus sealing or otherwise protecting or controlling the substrate.

Further background, though it does not disclose the treatment of hazardous material, is U.S. Defensive Publication T901,022, a U.S. patent application published Aug. 8, 1982, by the U.S. Patent and Trademark Office in its Official Gazette, 901 0.G. 416. That publication discloses foaming an acidic solution of surfactant and hydroxylated polymer, such as a polyvinyl alcohol or guar gum, and contacting the resulting foam, at a point adjacent to the point at which the foam issues from the foam generator, with an alkaline pH modifying agent, such as ammonia or ammonium hydroxide, to increase the pH of the foam to at least 7 and produce a gelled polymeric foam within 2 seconds, said gelled foam being useful for insulating, packaging, and acoustical purposes.

Briefly, this invention, in one aspect, provides a method of treating a substrate with an aqueous air foam, comprising the steps of (1) preparing an aqueous solution or dispersion comprising (a) water-soluble polyhydroxy polymer having a plurality of hydrogen-bondable diol structures or groupings in the polymer chain in the form of

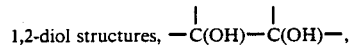

1,2-diol structures, $-\underset{|}{C}(OH)-\underset{|}{C}(OH)-$, and/or in the form of

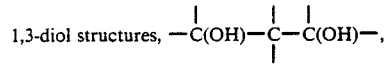

1,3-diol structures, $-\underset{|}{C}(OH)-\underset{|}{C}-\underset{|}{C}(OH)-$, such diol structures being capable of complexation with the borate anion, $B(OH)_4^-$, (b) polyvalent ionic complexing agent, such as a water-soluble, polyprotic inorganic acid salt, for example borax, $Na_2B_4O_7 \cdot 10H_2O$, or hydrated, polyvalent metal complex salt, which cross-links said polymer by hydrogen-bonding complexation, (c) foaming agent to impart persistence to the fluid, aqueous air foam generated upon aeration of said solution or dispersion, (d) a pH modifier, such as sodium hydroxide or acetic acid, to impart an appropriate pH to the solution or dispersion necessary for time-controlled formation of gelled or viscous air foam from the fluid air foam, and (e) water as the major component of said aqueous solution or dispersion by weight; (2) aerating said aqueous solution or dispersion to form therefrom a fluid, aqueous, aerated or air-entrained, low density foam (or air foam) which becomes gelled or viscous, generally at least 5 seconds after its formation; and (3) spraying, contacting or otherwise applying said fluid, aqueous air foam as a wet, three-dimensional coating, blanket, or layer to exposed surface of a substrate, such as a body of hazardous material, for example a hazardous waste dump, a pool of a spilled, volatile, flammable liquid, or other substrate to be protected from giving rise to a hazard, e.g. fire. The applied fluid foam gels, or increases in viscosity without gelling, generally at least 5 seconds after its formation, and thus stabilizes in situ and forms a wet, persistent or long-lasting, sealing or vapor suppressing, gelled, aqueous air foam or a viscous, aqueous air foam, in the form of a highly vapor-impermeable coating, blanket, or layer on the substrate. Such a coating results in minimizing, suppressing, controlling, reducing or preventing the emission, spreading, or release of gases, vapors, odors, dusts, or liquids that may be present in the hazardous material or substrate and physically immobilizing, constraining, consolidating, sealing, or inactivating the exposed surface so-coated.

(The term "air foam" is used in its industry-accepted sense to mean a foam made by physically mixing air into a liquid, and thus the term is distinct from chemical or carbon dioxide foam or halocarbon blown foam.)

The foam as prepared and applied is initially a fluid, two phase-system (an agglomeration of air bubbles) of a discontinuous or dispersed gas phase, viz. air, and a continuous, aqueous, polymer liquid phase, viz. bubble walls or lamellae, comprising water in which is dissolved or dispersed small amounts of polyhydroxy polymer, foaming agent, pH modifier, and the complexing agent such as the disassociated or ionized polyprotic inorganic acid salt. The water of the liquid phase can also contain dissolved or dispersed optional components, such as rubber or polymeric latex particles, fire retardant, pigment, dye, etc. The liquid phase of the foam is the major or predominant phase by weight. Upon or following application of the fluid foam to the hazardous material or substrate, and as a consequence of the crosslinking of the polyhydroxy polymer by the complexing agent, the three-dimensional structure of applied fluid air foam is thus stabilized in said time-controlled manner in the form of either a non-fluid, gelled, aqueous air foam or a viscous, aqueous air foam. The gelled air foam is a two-phase system of discontinuous gas (air) phase and a continuous, soft, semi-solid hydrogel phase comprising bound water and water-insoluble, crosslinked, hydrated polyhydroxy polymer. The viscous air foam is a two-phase system of discontinuous gas (air) phase and continuous aqueous polymer phase comprising water and polyhydroxy polymer. The polymer in both the gelled and viscous foams comprises a plurality of hydrated diol-containing polymer chains. The gelled or viscous phase is the major or predominant phase by weight. The lamellae or liquid film of the air bubbles in the applied fluid foam is gelled, or becomes viscous, thus minimizing, reducing, or preventing the drainage of liquid from the lamellae and the consequent rupture of the bubbles and collapse of the foam structure. Due to the hydrophilic nature of the polyhydroxy polymer, water in the foam is retained or bound and the water, together with the highly vapor-impermeable nature of the resulting gelled or viscous foam, provides a stable, persistent or long-lasting, sealing or vapor suppressing blanket or barrier on the exposed, treated surface of the hazardous material or substrate. Such a foam blanket excludes oxygen or air from the treated hazardous material, or lowers the vaporization rate of liquid in the hazardous material or substrate so-treated, and greatly facilitates clean-up procedures, such as excavation and hauling of excavated material by reducing the risk of ignition of flammable vapors or other combustible material, reducing the concentration of toxic vapors in the work area, and reducing the environmental impact of the hazardous material. For purposes of clean-up, the applied foam in the case of borate-crosslinked polymer, after it serves its purpose, can be sprayed or otherwise treated with a foam-collapsing or -breaking agent, such as dilute aqueous acid, the "reversible" nature of such a foam system being an important and useful property thereof.

The fluid, aqueous air foam can be conveniently formed by mechanically or physically entraining or dispersing air in the starting aqueous solution or dispersion of polyhydroxy polymer, for example by pumping the solution to air-aspirating, foam-producing equipment and applying, for example by spraying, the resulting fluid, low-density air foam onto the hazardous material or substrate. The starting solution or dispersion can be prepared at the time of application by bringing together two liquid streams from separate sources, one stream comprising water, complexing agent, pH modifier, and foaming agent and the other stream being in the form of a concentrate comprising polyhydroxy polymer dissolved or dispersed in an anhydrous, water-soluble or -dispersible, non-reactive organic solvent, such as mineral oil or diethylene glycol monoethyl ether acetate.

Advantages of the treatment, control, or management of hazardous materials or substrates with foam in accordance with this invention include: the use of an inexpensive and readily available raw material, namely water, which can be tepid (as is often found in field conditions) and is either fresh water, brackish water, or sea water, the water being the bulk of the weight of the foam; the use of foaming agent, pH modifier, and complexing agent, each of which is used in a relatively small amount and many types of which are commercially available; a polymer which is also used in relatively small amounts and is environmentally acceptable, many types of such polymer being commercially available; a treatment which can use equipment that is not particularly energy intensive or expensive and can be conventional or easily-modified conventional equipment, namely, pumps, valves, regulators, mixers, tanks, hoses, and foam-generating nozzles such as air-aspirating or air-injecting nozzles, etc., the operation of which can be carried out without specialized labor; the fact that the gelled or viscous foam can be formed in a time-controlled manner from the fluid foam, which is particularly meaningful when the fluid foam is applied to a vertical or inclined surface; the fact that the gelled or viscous foam does not significantly increase the weight and volume of the hazardous material or substrate to which it is applied, that is, there is a high substrate-to-foam weight or volume ratio; and the facts that the gelled or viscous foam is conformable and adheres to many types of substrates, is relatively innocuous, environmentally acceptable, noncorrosive, nonflammable, relatively stable and persistent or long-lasting, inherently white or light-colored and can be dyed (thus the extent of application is visually perceptible), does not require high application temperatures or drying, and rapidly covers, traps, immobilizes, restrains, or consolidates the hazardous material or substrate, is quickly effective as a control measure, and can, in many cases, be readily cleaned up.

The water-soluble, polyhydroxy polymers used in this invention are known organic materials (see, for example, Davidson, R. L., "Handbook of Water-Soluble Gums and Resins," McGraw-Hill Book Co., (1988), e.g. Chaps. 6 and 20). An example of a synthetic, water-soluble polyhydroxy polymer useful in the practice of this invention is poly(vinyl alcohol), which is typically manufactured by the hydrolysis of poly(vinyl acetate). It is sometimes described in the art as a polyhydric alcohol with secondary hydroxyl groups on alternate carbon atoms in the form of 1,3-diol structures, and represented structurally as:

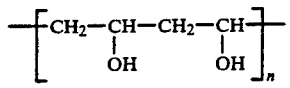

Preferred poly(vinyl alcohol) materials are those derived from poly(vinyl acetate) by at least 98% hydrolysis thereof and having a molecular weight of at least 10,000, preferably greater than 50,000, and most preferably greater than 75,000. Lower molecular weight poly(vinyl alcohol), e.g. with molecular weights of 10,000–50,000, should preferably be 100% hydrolyzed poly(vinyl acetate). The lower the molecular weight, the larger the amount of the polymer needed for achieving desired foam properties.

A class of naturally-occurring, water-soluble polyhydroxy polymers useful in the practice of this invention is the class of water-soluble polysaccharides with high molecular weight (generally at least 100,000) and having cis 1,2-diol structures in one or more monosaccharide units in the polymer chain, preferred polysaccharides being galactomannan gums, such as guar gum and locust bean gum. (See, for example, U.S. Pat. No. 4,579,942 (Brode et al) for a disclosure of such polysaccharides, which disclosure is incorporated herein by reference.) Guar gum has long been known to be useful as a thickening agent for water and is approved as a direct food additive by the U.S. Food and Drug Administration. The structure of guar gum has been accepted as being that of a linear, alternating copolymer (e.g. see p. 6-3 and 6-4 of "Handbook of Water-Soluble Gums and Resins," supra) having cis 1,2-diol groupings in the anhydrohexose units, and can be structurally represented as

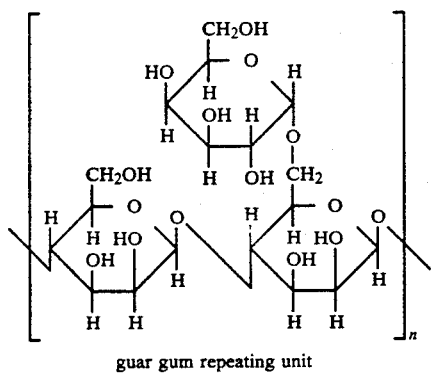

guar gum repeating unit

A commercially available guar gum useful in the practice of this invention is JAGUAR ® 6003.

Also useful in the practice of this invention are the derivatives of guar gum, such as those formed by etherification and esterification reactions with the hydroxy functionalities. The commercially significant derivatives are mainly those prepared by etherification, e.g. hydroxyethylation with ethylene oxide, hydroxypropylation with propylene oxide, carboxymethylation with monochloroacetic acid, and quaternization with various quaternary amine compounds containing reactive chloro or epoxy sites. In the case of guar gum, each saccharide ring or anhydrohexose unit contain an average of 3 hydroxy groups. For the guar gum derivatives, molar substitution of the hydroxy groups should preferably not exceed an average of one substitution of hydroxy groups per anhydrohexose unit. A preferred range of molar substitution, e.g. with hydroxypropyl groups, is 0.1 to 2, most preferably from 0.2 to 0.6. An especially useful guar gum derivative is hydroxypropyl guar gum, a commercially available example of which is JAGUAR ® HP-11, with an average of 0.35 to 0.45 moles of hydroxypropylation per each anhydrohexose unit of the guar gum.

The polyvalent ionic complexing agents useful in this invention include known crosslinking agents for the polyhydroxy polymers and representatively include alkali metal borates such as sodium and potassium borates, alkali metal pyroantimonates such as sodium and potassium pyroantimonates, titanates such as sodium and potassium fluorotitanates and potassium titanium oxalate, chromates such as sodium and potassium chromates and dichromates, vanadates such as ammonium vanadate, and the like (see, for example, said U.S. Defensive Publication T901,022 and U.S. Pat. Nos. 4,021,355, 4,568,481, 3,264,245, and 3,794,115 for further disclosure of such crosslinking agents). Borax, $Na_2B_4O_7 \cdot 10H_2O$, the salt of a strong base and a weak acid, hydrolyzes in aqueous solution to form a boric acid-borate buffer having a pH of around 9. The borate anion, $B(OH)_4^-$, present in alkaline solutions, is capable of complexation, through hydrogen bonding, with the cis 1,2-diol or the 1,3-diol groupings in the polyhydroxy polymer, leading to crosslinking thereof, which complexation may be illustrated as follows:

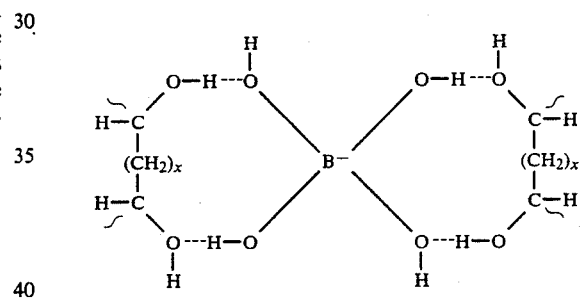

where x is zero, e.g. as in the case of a galactomannan gum such as guar gum or a derivative thereof such as hydroxypropyl guar gum, or x is 1, e.g. as in the case of poly(vinyl alcohol). E. Z. Casassa et al., *J. of Chem. Ed.* 63, 57–60 (1986) illustrates such complexation.

The foaming agents useful in this invention are surface active agents or surfactants which are synthetic or natural organic compounds or materials capable of foaming water, and which are compatible with the polyhydroxy polymers, the polyvalent ionic complexing agents, and pH modifiers used in this invention. Suitable surfactants can be nonionic, cationic, anionic, or amphoteric, and compatible mixtures thereof. Classes of surfactants which are useful include: soaps or the salts of fatty acids, such as those having the general formula RCOOM, where R is a fatty aliphatic group and M is an alkali metal, e.g., sodium oleate, laurate, palmitate, or stearate; fatty alkyl sulfates, such as those of the general formula $ROSO_2OM$, e.g., sodium octyl, decyl, lauryl, tetradecyl, hexadecyl, heptadecyl, or octadecyl sulfate; salts of alkarylsulfonic acids, such as those of the general formula $RC_6H_4SO_3M$, e.g., sodium octylbenzene sulfonate; ethylene oxide adducts, such as those of the general formula $R(CH_2CH_2O)_nH$ where R is a fatty aliphatic radical, e.g., where R is $C_{10}H_{21}O$ to $C_{16}H_{33}O$ and n is 10 to 60; those of the general formula $R(OCH_2CH_2)_nOSO_3M$, where R is a $C_{10}$ to $C_{18}$ alkyl, n is 1 to 3, and M is sodium; and salts of dialkyl Sulfosuccinic acids, e.g., sodium dioctyl sulfosuccinate. Also see *Encyclopedia of Chemical Technology*, Kirk-Othmer, 3rd Ed., Vol. 22, pages 347-387, John Wiley & Sons (1983) for other surfactants useful in this invention. Many of these hydrocarbon surfactants are biodegradable, making the foams of this invention made therefrom particularly advantageous where their biodegradability is desired, e.g. in treating municipal waste sites and sanitary landfills or in protecting combustible material from fire. Said European Patent Application EP 206548A discloses a host of fluoroaliphatic surfactants, e.g. $C_8F_{17}SO_3K$, $C_6F_{13}SO_2N(CH_2CH(OH)CH_2SO_3^-)C_3H_6N^+(CH_3)_2C_2H_4OH$, and $C_6F_{13}SO_2N(C_3H_6SO_3^-)C_3H_6N^+(CH_3)_2C_2H_4OH$, which can likewise be used in this invention. FLuoroaliphatic surfactants can be used in this invention alone or in combination as mixtures, and they can be used in combination with the hydrocarbon surfactants, and the disclosure of foaming surfactants in EP 206548A are incorporated herein by reference for purposes of brevity.

The pH modifiers used in preparation of the starting aqueous solution or dispersion of this invention can be acids to lower the pH such as organic acids, e.g. acetic, oxalic, or citric acid, or mineral acids, e.g. hydrochloric acid, or can be bases to raise the pH, such as organic bases, e.g. triethanolamine, or inorganic bases, e.g. sodium or ammonium hydroxide, the particular pH modifier to be used for a particular foam system being dependent on the particular polyvalent ionic complexing agent chosen and the amount of pH modifier to be used being dependent on the pH necessary for the formation of the foam and the type thereof (gelled or viscous). For a foam system where borax is used as the crosslinking agent, gelation would be premature, that is, occur too fast and before adequate air is entrained, if the pH of the starting aqueous solution or dispersion is too low and a base pH modifier is not included in the formulation to raise its pH. For a foam system where a crosslinking agent such as potassium pyroantimonate is used, desired gelation or viscosity build-up would not occur or readily occur if the pH of the starting aqueous solution or dispersion is too high and an acid pH modifier is not included in the formulation to lower its pH.

The relative amounts of the various components of the foamable aqueous solutions or dispersions and foams of this invention can vary widely. Functionally expressed, the amount of surfactant foaming agent to be used will be that sufficient to cause the aqueous foamable solution or dispersion, upon aeration, to form a foam having a density of less than 1 g/cc or having an expansion value (i.e., the ratio of the volume of aqueous air foam to the volume of starting aqueous solution or dispersion) generally greater than about 1.5, and preferably 2 to 20 (a range which can be characterized as "low expansion") and which can be as high as 200 or even 1000. Such a foam will thus float on water and is less dense than most other liquids, e.g. flammable liquids, and thus is generally buoyant. Generally, the surfactant will be about 0.05 to 2 weight percent, preferably about 0.2 to 0.5 weight percent, of the foamable aqueous solution or dispersion. The amount of polyhydroxy polymer in the aqueous foamable solution will be that sufficient upon crosslinking to cause the fluid foam to gel or merely increase the viscosity of the fluid foam, whichever is desired, at a desired time after application of the fluid foam to the hazardous material or substrate. That time generally is at least 5 seconds, and can be as long as 20 minutes or longer, after the fluid, aqueous air foam is formed, depending, for example, on the chemical structures of the polyhydroxy polymer and the polyvalent ionic complexing agent and their amounts and especially on the pH of the foamable solution or dispersion, on the desired extent or nature of the application, e.g. how large an area is to be covered with the fluid foam before it gels or reaches its desired increase in viscosity, on whether the substrate is horizontal, vertical, or inclined, and on the particular hazard to be controlled, etc. Generally, the amount of the polyhydroxy polymer (excluding its organic solvent or dispersing agent) will be a small amount, about 0.2 to 3 weight percent, preferably about 0.5 to 2 weight percent, of the foamable aqueous solution or dispersion; thus, the solids content of the foams of this invention which is attributable to the crosslinked polyhydroxy polymer will be low. When the polyhydroxy polymer (particularly galactomannan gum) is used in the form of a concentrate dispersion in an organic solvent, e.g. mineral oil or diethylene glycol monoethyl ether acetate, such dispersion will have a concentration generally about 30 to 50 weight percent of the polymer, depending upon the molecular weight and chemical nature of the polymer. Generally, the amount of such organic solvent in the foamable aqueous solution or dispersion and foam thereof will be less than about 5 weight percent, preferably less than about 3 weight percent.

The amount of water to be used will be that amount to provide sufficiently low viscosity to the foamable aqueous solution or dispersion to enable its efficient handling and to enable the fluid foam formed therefrom to have sufficient expansion and quality and flow and cover the desired substrate area. In any case, however, the amount of water to be used will be such that it is the major component by weight, i.e. greater than 50 weight percent and generally about 55 to 99.5 weight percent, preferably 75 to 99.5 weight percent, of the aqueous foamable solution or dispersion (as well as of the fluid foam and gelled or viscous foam produced therefrom). The amount of air to be entrained in the aqueous foamable solution or dispersion will be that necessary to obtain a sufficient expansion value. However, the amount of air to be entrained generally will be such that the fluid air foam and the gelled or viscous air foam formed therefrom will have the aforementioned expansion value, and preferably the entrained air will be the major component of the foam thereof by volume, i.e. greater than 50 volume percent, and even as high as 98 volume percent or higher, and more preferably in the range of 75 to 98 volume percent.

The particular foam formulation components and relative amounts thereof to be used for a foam system of this invention, having the desired expansion value, gelation or viscosity increase time, and other foam properties, can be readily determined in the laboratory using a Waring blender or other laboratory mixer for mixing the components and for mechanically entraining air.

For a gelled foam of this invention, gel time is defined as the time required for the freshly prepared fluid aqueous air foam to become non-flowable, which can be determined conveniently in the laboratory by pouring the fluid foam repeatedly from one beaker to another beaker until it is no longer pourable.

For a preferred gelled foam system based on guar gum or hydroxypropyl guar gum as the polyhydroxy polymer and borax as the crosslinking agent, an aqueous solution having a pH of about 9 to 10.5, preferably 9 to 10 (which alkaline pH control can be obtained by adding appropriate amounts of a base, e.g. NaOH, $Na_2CO_3$, or $NH_4OH$), containing 0.2 to 2 weight percent, preferably 0.5 to 1 weight percent, of the gum, and containing 0.2 to 0.5 weight percent of a surfactant as a foaming agent, can be gelled with borax, using a borax:gum weight ratio of 1:20 to 1:1, preferably 1:10 to 1:5. In preparing the foamable, aqueous solution or dispersion for this foam system, the borax is added to the formulation after the guar component has been in contact with the water of the formulation for a residence hydration time of 15 to 600 seconds or as long as 3 hours or longer, preferably at least 30 seconds. If the hydration time is less than 15 seconds, the solution or dispersion generally does not readily gel. If the pH of the foamable aqueous solution or dispersion is alkaline but lower than about 9, the solution or dispersion will generally gel before foaming or before sufficient air is entrained. If the pH is greater than about 10.5, the desired gelation or viscosity-buildup may be too long or not occur.

For a preferred gelled foam system based on guar gum or hydroxypropyl guar gum as the polyhydroxy polymer and potassium pyroantimonate, $K_2H_2Sb_2O_7$, as the crosslinking agent, an aqueous solution or dispersion having a pH of 3.5 to 5.5 and preferably 4 to 4.5 (which pH control can be obtained by adding appropriate amounts of an acid, e.g. acetic acid, oxalic acid, citric acid, HCl, $H_2SO_4$, $H_4PO_4$, $HNO_3$, $KHSO_4$, or $KHSO_4$ in combination with $NaOCOCH_3$), containing 0.4 to 3 weight percent, preferably 0.75 to 2.5 weight percent, gum, and containing 0.2 to 0.5 weight percent of a surfactant foaming agent, can be gelled with potassium pyroantimonate using a pyroantimonate:gum weight ratio of 1:50 to 1:20, preferably 1:40 to 1:30. If the pH of the aqueous solution or dispersion of polymer is lower than about 3, the initially-formed foam generally collapses quickly, and if the pH is greater than about 6, the solution generally does not foam readily.

Optional components of the foam systems of this invention include: foam stabilizers, such as ethylene glycol, diethylene glycol, glycerol, ethyl CELLOSOLVE ®, and butyl CARBITOL ®; foam tougheners and shrink control agents, such as aqueous rubber or polymeric latices, e.g. styrene-butadiene rubber latices, poly(chloroprene) rubber latices, poly(chloroprene-co-methacrylic acid) rubber latices, and the polymer latices described in U.S. Pat. No. 4,315,703; dyes, and pigments, such as titanium dioxide; fire retardants, such as diammonium phosphate, ammonium phosphate, ammonium sulfate, and ammonium polyphosphate; and other additives or components such as electrolytes, corrosion inhibitors, and biocides. Such optional components should be compatible with the other components in the systems and are used in amounts which do not disadvantageously affect the desired properties, such as foamability, and function, such as the sealing capability, of the foam system. The total amount of solids attributable to said optional components in the case of the foam systems will be such that the aqueous solution or dispersion is still foamable and the density of the foam prepared therefrom is less than 1 g/cc. Generally, the amount of solids attributable to said optional components will be less than about 40 weight percent, preferably less than about 30 weight percent, of the foamable aqueous solution or dispersion.

Said European Patent Application EP 206548A discloses a proportioning, foam-generating and foam-application apparatus which is useful as well in making the foam products of this invention, such disclosure being incorporated herein by reference.

The hazardous materials which can be treated or controlled with the foam in accordance with this invention include the various materials present in hazardous waste sites described at the beginning of this specification, such as land burial dumps, impoundments, and lagoons. Such materials can be organic or inorganic liquids, semi-liquids, or solids, such as synthetic or natural organic chemicals, heavy or toxic metals, solvents, effluents, household garbage and trash, discarded products, spent raw materials, contaminated containers, sludges, mill tailings, burn residues, contaminated soil, flammable and volatile liquids, etc., disposed in such sites from industrial and commercial operations, etc. Such wastes can be toxic, noxious, ignitable, flammable, combustible, corrosive, or dangerously reactive. The body of such materials can be treated in situ with the foam or as excavated or removed from such sites. Spills or leaks of hazardous liquids from pipelines or containers such as tanks or vehicles can also be treated.

The foams of this invention are particularly useful during or in connection with the excavation of material from hazardous waste sites (e.g. "Superfund sites"), a type of clean-up operation which many believe is the best solution to the problems posed by such sites.

Materials which are not wastes, spills, or the like but rather have utility and are innately harmful, have toxicity, or are potentially hazardous, can also be treated with the foam, for example coal in transport by train cars or barges or the coal in mine tunnels, to seal the exposed surfaces from air and minimize or prevent fires or to control such fires. Combustible material, such as wooden structures like houses and vegetation like brush, grass fields, and forests, can be treated to prevent or control fires or fire damage thereof. Thus, the term "hazardous" in its broader sense is used in this application to include present or imminent hazards due to existing exposure as well as potential hazards due to the innate harmful or toxic effects of a material which becomes hazardous upon exposure. The amount or thickness of foam applied to the hazardous material or substrate or the extent of its application can vary depending on such factors as the nature, magnitude, location, and permanency of the hazardous material or substrates, the presence of environmental factors such as wind, rain, drainage, etc., and the particular threat to health, safety, and environment that the material poses. The thickness of the foam applied to the material thus can vary, for example from about 1 cm to 30 cm or higher, e.g. up to 1 meter or more. In any event, the thickness of the foam will generally be sufficient to alleviate or prevent the threat posed by the material. Where the material evolves or releases volatile or superficial products such as gases, fumes, vapors, dust, etc., or it is desired to seal a material from ambient air to control or prevent combustion or oxidation of the material, the amount or thickness of the foam will be such as to suppress the volatilization or escape of the material to the atmosphere or suppress its contact with atmosphere, the high degree of vapor impermeability of the foam due to its large amount of water and foam cell structure significantly contributing to such suppression.

Objects and advantages of this invention are illustrated in the following examples, in which the preparation of various aqueous, air foams of this invention are described as well as some tests thereof indicative of their utility in the treatment of various substrates.

EXAMPLE 1

A 1.0 wt. % aqueous solution of powdered guar gum (JAGUAR ® 6003) was prepared by adding a concentrate dispersion of 160 g of the guar powder in 240 g of diethylene glycol monoethyl ether acetate to 15.6 liters of slowly stirred water.

After about 2 hours, a gelable aqueous air foam was prepared by mixing in a Waring blender, for 15 seconds at medium speed, 50 g of the above aqueous guar gum solution, 50 g of water, 1.25 g of a 10 wt. % aqueous sodium hydroxide solution as a pH modifier, 0.4 g sodium lauryl sulfate as a foaming agent, and 2.5 g of a 4.0 wt. % aqueous solution of borax, $Na_2B_4O_7 \cdot 10H_2O$, as a crosslinking agent. The resulting fluid, aqueous air foam, having an appearance similar to freshly discharged aerosol shaving cream and having an expansion value of 4 to 5, gelled in about 30 seconds to form a gelled, aqueous air foam.

EXAMPLE 2

In a Waring blender was placed 100 g of water and 0.50 g of a hydroxypropyl guar gum derivative (JAGUAR ® HP-11). After blending this mixture at medium speed setting for 30 seconds, 1.5 g of a 25 wt. % aqueous solution of $C_6F_{13}SO_2N(CH_2CH(OH)CH_2SO_3^-)C_3H_6N^+(CH_3)_2C_2H_4OH$ foaming agent, 0.3 g of 10 wt. % aqueous sodium hydroxide solution, 1.25 g of a 4.0 wt. % aqueous solution of borax were added and the total mixture blended an additional 15 seconds to provide an aqueous, fluid air foam with an expansion value of 4 to 5 and a gel time of about 30 seconds.

A repeat of this example with 1.25 g of a 40 wt. % dispersion of JAGUAR ® HP-11 in mineral oil (instead of 0.50 g of the neat hydroxypropyl guar gum) gave an aqueous air foam with an expansion value of 4 to 5 and a gel time of about 30 seconds.

EXAMPLE 3

In a Waring blender was placed 90 g of water and 0.5 g of JAGUAR ® HP-11. After blending this mixture for 30 seconds at medium speed setting, 1.5 g of a hydrocarbon foaming agent, 1.0 g of 10 wt. % aqueous sodium hydroxide solution, 2.5 g of a 4.0 wt. % aqueous solution of borax, and 10 g of 50 wt. % aqueous latex of styrene-butadiene rubber ("DOW 633A") were added and the total mixture blended an additional 15 seconds to provide a rubber-reinforced, fluid, aqueous air foam with an expansion value of 3 to 4 and a gel time of 30 to 60 seconds. The hydrocarbon foaming agent used was a solution of 21.2 wt. % sodium decyl sulfate, 5.3 wt. % N,N-dimethyl dodecylamine oxide, 26.5 wt. % diethylene glycol monobutyl ether, and 47 wt. % water.

EXAMPLE 4

In a Waring blender were placed 100 g of water, 2.5 g of 40 wt. % JAGUAR ® HP-11 suspension in mineral oil, 0.2 g pyroantimonate gelling agent ("DW-3", Hi-Tek Polymers, Inc., a 13 wt. % potassium pyroantimonate in an ethylene glycol, potassium hydroxide and water solution), 2.0 g of the foaming agent of EXAMPLE 2, and 0.80 g of glacial acetic acid. This mixture was blended 30 seconds at a medium speed setting to provide an aqueous air foam with an expansion value of 4 and a gel time of about 60 seconds.

A repeat of this example with 0.70 g (instead of 0.80 g) glacial acetic acid gave an aqueous air foam with a gel time between 60 and 120 seconds.

EXAMPLE 5

A suspension in mineral oil of 33 wt. % JAGUAR ® HP-11 and 3.3 wt. % glacial acetic acid was metered by eduction at a rate of approximately 5 wt. % into an aqueous stream (flowing in a rubber hose, about 2.5 cm diameter, from a pressurized, 20-liter tank) consisting of 1.5 wt. % of the foaming agent used in Example 2, and 0.5 wt. % gelling agent used in Example 4. The combined aqueous stream was mixed with air by passing the stream through a low-expansion, air-aspirating nozzle, "PYRENE Foam Playpipe", Model PP16-6, to provide an aqueous air foam with an expansion value of 5 and a gel time of less than 180 seconds.

EXAMPLES 6 and 7

These examples illustrate the suppression of a body of triethylamine with a gelled foam of this invention.

In such example, in the lower half of a disassembled two-piece, 25 cm diameter, cylindrical, glass chamber, having a total volume of about 5100 cc, was placed triethylamine to a depth of about 5 cm. The upper half of the glass chamber, containing a foam entry port and nitrogen gas inlet and outlet openings, was then placed on top of the lower half of the chamber containing the triethylamine. An aqueous, fluid air foam (compositions described in Table 1 below) was added to the chamber and the latter purged with nitrogen, as described below. A gas-tight seal between the upper and lower halves of the chamber was achieved by lubrication of the ground glass, mating edges of the two halves with a silicone grease before assembly.

In each example, a nitrogen gas purge of about 340 cc per minute was established and maintained in the chamber before and after adding the fluid foam. Immediately after foam generation, the fluid foam was added to the chamber through the foam port, covering the triethylamine to a depth of about 2.5 to 5.0 cm with foam, which subsequently gelled. The foam port was then closed and the exiting nitrogen purge gas analyzed by gas chromatography (gc) for the presence of triethylamine.

The suppression of triethylamine vapor by the gelled foam was calculated at various time intervals by comparing triethylamine gc peak areas ("counts") with foam present to triethylamine gc peak areas measured before adding foam to the triethylamine layer. The results are shown in Table 2.

The foamable compositions A and B, set forth in Table 1, were employed to generate the aqueous air foams used in these examples. Aqueous air foams A' and B' were generated from compositions A and B, respectively, by combining the ingredients in a large Waring blender and mixing for 15 to 30 seconds on a medium setting. The foams had an expansion value of 4 to 5 and a gel time of about 30 to 60 seconds.

TABLE 1

| | Foamable Solution | |
|---|---|---|
| Ingredient, g | A | B |
| Polyhydroxy polymer | | |
| Hydroxypropyl guar gum, JAGUAR ® HP-11 | 350 | |
| 1% wt. % aqueous solution | | |
| Poly(vinyl alcohol), 14,000 MW, | | 50 |

TABLE 1-continued

| | Foamable Solution | |
|---|---|---|
| Ingredient, g | A | B |
| 100% hydrolyzed poly(vinyl acetate) 20% wt. % aqueous solution | | |
| Water | 436 | 350 |
| Foaming agent | | |
| LIGHT WATER ® AFFF/ATC FC-600 surfactant 7 wt. % aqueous solution | 26 | 40 |
| Crosslinking agent | | |
| Borax 4 wt. % aqueous solution | 8.75 | 25 |
| pH Modifying agent | | |
| Sodium hydroxide, 50 wt. % aqueous solution | 1.05 | 7.5 |
| Reinforcing agent | | |
| Styrene/butadiene rubber latex, "DOW 638A" 50% aqueous solution | 70 | 200 |

TABLE 2

| Elapsed time after foam application to triethylamine, hours | Percent Vapor Suppression | | |
|---|---|---|---|
| | Ex. 6 Foam A' | Ex. 7 Foam B' | No Foam |
| 1 | 97 | 98 | 0 |
| 4 | 75 | 94 | 0 |
| 6 | 72 | 90 | 0 |
| 16 | 70 | 72 | 0 |

EXAMPLE 8

This example illustrates the use of a foam of the invention to suppress the vapors of benzene. The same apparatus and general procedure used for Examples 6 and 7 were used.

Benzene was placed on a pool of water in the bottom half of the glass chamber described in Examples 6 and 7. A foam was generated from the following ingredients:
hydroxypropyl guar gum, JAGUAR ® HP-11 (200 g of 1 wt. % aqueous solution)
water (250 g)
sodium lauryl sulfate (2.8 g)
borax (5.1 g of a 4.0 wt. % aqueous solution)
sodium hydroxide (1.7 g of a 50 wt. % aqueous solution)
styrene-butadiene latex ("DOW 638A") (40 g. of a 50 wt. % aqueous suspension)

The foam was generated as described in Examples 6 and 7 and immediately applied to the benzene layer through foam port of the upper chamber. Vapor suppression data obtained by monitoring the nitrogen gas sweep through the chamber, before and at various time intervals after adding the foam, are reported in Table 3 below.

TABLE 3

| Elapsed time after foam application to benzene, hours | Percent Vapor Suppression | |
|---|---|---|
| | Ex. 8 | No foam |
| 0.5 | 92.5 | 0 |
| 2 | 95 | 0 |
| 6 | 94 | 0 |
| 16 | 92 | 0 |
| 120 | 89 | 0 |

EXAMPLE 9

In this example, an aqueous air foam of this invention was used to suppress the evaporation of ammonia vapor from a body of liquid ammonia.

In each of two 800 mL beakers was placed about 50 g of liquid ammonia mixed with 50 g of SUPERCELL ® diatomaceous earth (to absorb the ammonia).

Into one of these beakers (Beaker A) was poured an aqueous air foam (immediately after generation) prepared by mixing for 30 seconds in a Waring blender at medium speed setting the following ingredients: 50 g of a 1.0 wt. % aqueous solution of JAGUAR ® HP-11, 60 g of water, 7 g of the foaming agent used in Examples 6 and 7, 0.25 g 25 wt. % aqueous sodium hydroxide, 10 g of 50 wt. % aqueous styrene-butadiene rubber latex ("DOW 638A") reinforcing agent, and 2.0 g of a 4.0 wt. % aqueous solution of borax gelling agent. The foam expansion value was 3 to 4 and the gel time was about 60 seconds.

The initial foam thickness placed on the liquid ammonia-diatomaceous earth mixture in Beaker A was about 2.5 cm. The second beaker (Beaker B) was a comparative example in which no foam cover was used. The rate of evaporation of ammonia vapor was measured by weight loss from the beakers at room temperature (about 22° C.) in a fume hood. The results are summarized in Table 4.

TABLE 4

| Elapsed time after foam application, minutes | Percent Weight Loss | |
|---|---|---|
| | Ex. 9 Beaker A | Comparative example Beaker B |
| 0 | 0 | 0 |
| 2 | 0.2 | 2 |
| 5 | 0.5 | 6 |
| 9 | 0.9 | 10 |
| 15 | 2.0 | 17 |
| 40 | 9.8 | — |
| 75 | 26.2 | — |

EXAMPLE 10

This example illustrates the reversibility of a borate-gelled, aqueous air foam of this invention based upon guar gum polymers.

A 0 75 wt. % aqueous solution of JAGUAR ® HP-11 was prepared by adding a suspension of 120 g of the guar powder in 180 g of diethylene glycol monoethyl ether acetate to 15.7 liters of slowly stirred water.

After about 2 hours, a gelable, aqueous air foam was prepared by mixing in a Waring blender for 15 seconds at medium speed 100 g of the above aqueous guar solution, 1.25 g of a 10 wt. % aqueous sodium hydroxide solution, 1.0 g of the foaming agent used in Example 2, and 2.5 g of a 4.0 wt. % aqueous borax solution. The resulting foam, having an expansion value of 4 to 5, was immediately poured into a 10×13 cm aluminum container to give a 4 cm thick foam which gelled in about 30 seconds (Foam A).

An identical foam was prepared in another container (Foam B).

100 mL of water was poured onto Foam A from a height of about 30 cm with no penetration or disruption of the gelled foam.

100 mL of 2 wt. % aqueous acetic acid was poured from a height of about 30 cm onto Foam B which resulted in penetration and collapse of the gelled foam where it was contacted by the acid solution. Use of an underivatized guar gum (JAGUAR ® 6003) in a similar example gave similar results.

EXAMPLE 11

This example illustrates the reversibility of a borate-gelled, aqueous air foam of this invention based on poly(vinyl alcohol).

A 2.0 wt. % aqueous solution of poly(vinyl alcohol) (VINOL®, a 100% hydrolyzed poly(vinyl acetate, average mol. wt. about 78,000), was prepared by heating to about 95° C. a stirred mixture of 20 g of the polymer and 980 g of water for about 15 minutes and allowing the resulting solution to cool to room temperature.

Two identical foam samples were prepared by combining in a Waring blender 100 g of the above 2.0 wt. % poly(vinyl alcohol) solution, 1.0 g of the foaming agent used in Example 2, 1.25 g of a 10 wt. % aqueous solution of sodium hydroxide, and 2.5 g of a 4.0 wt. % aqueous solution of borax, and immediately mixed for about 15 seconds using a medium setting on the blender. The resulting foams were poured into a 10 cm×13 cm aluminum trays. The foams which had an expansion value of about 4.5, gelled in about 30 seconds.

The first foam was subjected to twenty sprays (total volume about 20 mL) of tap water from a plastic spray bottle from a distance of 8 to 10 cm. The foam remained intact.

Using a similar procedure, the second foam sample was subjected to twenty sprays (total volume about 20 mL) of a 0.5 wt. % aqueous acetic acid solution (prepared by diluting 10 mL of household vinegar, Red Owl Brand apple cider vinegar, with 90 mL water). The gelled foam collapsed.

Essentially identical results were obtained when this example was repeated using 100 g of 0.75 wt. % of an aqueous solution of JAGUAR® HP-11 in place of the 100 g of 2.0 wt. % aqueous poly(vinyl alcohol) solution.

EXAMPLE 12

This example further illustrates the reversible properties of an aqueous air foam of this invention.

A guar gum-based, gelled foam was prepared in a Waring blender from 100 g of 0.75 wt. % aqueous solution of JAGUAR® HP-11 using the ingredients and procedure described in EXAMPLE 10. A gelled aqueous air foam having a pH of about 10, an expansion value of about 4.5, and a gel time of about 30 seconds was thus obtained. To this foam in the blender was added 1.0 g of glacial acetic acid and the blender contents mixed for about 15 seconds to yield a non-gelled fluid foam having a pH of 4.5. To this fluid foam was added 9.5 g of 10 wt. % aqueous sodium hydroxide solution and the blender contents stirred again for about 15 seconds to yield a foam (pH 10) which gelled in about 30 seconds.

EXAMPLE 13

This example illustrates the preparation and use of a guar gum-based, fire-retardant, aqueous air foam containing diammonium phosphate.

In a Waring blender was placed 40 mL water, 50 g of a 1.0 wt. % aqueous solution of JAGUAR® HP-11, 2.5 g of 4.0 wt. % aqueous solution,, of borax, 2.0 g of the foaming agent used in EXAMPLE 3, 11 g of 10 wt. % aqueous NaOH, and 1.0 g of diammonium phosphate. The resulting foam was poured into a 10×13 cm aluminum tray and allowed to stand in a laboratory fume hood for about 24 hours, the top surface of the gelled foam layer becoming dry to the touch. A lighted match was placed on the surface of the foam layer igniting the surface, but the combustion of the foam was not sustained when the lighted match was removed. A duplicate foam made without use of the diammonium phosphate did support combustion, the total surface of such foam igniting and most of it charring.

EXAMPLES 14 AND 15

These examples illustrate the preparation and use of guar gum-based aqueous air foams as fire-retardants.

The foams were prepared using the ingredients listed in TABLE 5. The components were mixed for 15 seconds in a Waring blender on medium speed setting just prior to use.

TABLE 5

| Ingredient, g | Foamable Solutions | | | | |
| --- | --- | --- | --- | --- | --- |
| | C | D | E | F | G |
| JAGUAR® HP-11, 0.75 wt. % aqueous solution | 0 | 0 | 100 | 100 | 100 |
| Water | 100 | 100 | 0 | 0 | 0 |
| Foaming agent (same as used in EXAMPLE 2) wt. 25% aqueous solution | 1.0 | 1.0 | 1.0 | 1.0 | 1.0 |
| Crosslinking agent | | | | | |
| Borax, 4.0 wt. % aqueous solution | 0 | 0 | 0 | 2.5 | 2.5 |
| pH modifying agent | | | | | |
| Sodium hydroxide, 10 wt. % aqueous solution | 0 | 0 | 0 | 1.25 | 11.0 |
| Flame retardant | | | | | |
| Diammonium phosphate | 0 | 1.0 | 0 | 0 | 1.0 |
| Foam properties | | | | | |
| Foam expansion value | 6.5 | 7 | 4.5 | 4 | 4 |
| Gel time, seconds | NG* | NG | NG | 40 | 40 |

*NG = no gelation

Immediately after foam generation, approximately 50 g of each foam was poured over a wooden tongue depressor bent into a triangular shape. About 60 seconds after the foam was in place, the flame from a Meker burner (4 cm diameter flame) was held 1 to 2 cm from the surface of the foam. The time for the following events were noted: (1) initial charring or burning, (2) approximate 50% destruction, and (3) 100% destruction. The results are summarized in TABLE 6, where the letter of each foam corresponds to the letter of the foamable solution from which it was prepared.

TABLE 6

| | Time in seconds | | | | | |
| --- | --- | --- | --- | --- | --- | --- |
| | COMPARATIVE EXAMPLES | | | | | |
| | 1 | 2 | 3 | 4 | EX. 14 | EX. 15 |
| Event: | No foam | Foam C | Foam D | Foam E | Foam F | Foam G |
| Initial charring or burning | 5 | 10 | 15 | 60 | 330 | 600* |
| 50% destruction | 15 | 60 | 120 | 180 | 510 | — |
| 100% destruction | 30 | 180 | 250 | 480 | — | — |

*very slightly charred

TABLE 6 shows that a guar gum-based foam (Foam E), although containing no gelling agent, gave good flame resistance over foams containing no guar gum (Foams C and D). However, the wood substrate covered with a gelled guar gum-based foam of this invention (Foam F) required 5 times longer for initial charring or burning of the foam-covered wooden substrate than the wood protected by non-gelled guar gum-based foam (Foam E).

Also, it is especially noteworthy that the wooden substrate protected with the gelled guar gum-based foam containing diammonium phosphate (Foam G) required 2 times longer for initial charring or burning than the wood substrate covered with a gelled guar gum-based foam containing no flame retarder (Foam F) and 10 times longer than wood substrate covered with a non-gelled guar gum-based foam (Foam E).

Various modifications and alterations of this invention will become apparent to those skilled in the art without departing from the scope and spirit of this invention.

What is claimed is:

1. A method of treating a substrate with an aqueous air foam, comprising the steps of
   (1) preparing an aqueous solution or dispersion comprising (a) water-soluble polyhydroxy polymer having a plurality of hydrogen-bondable diol structures in the polymer chain in the form of 1,2-diol and/or 1,3-diol structures which are capable of complexation with borate anion, (b) water-soluble polyprotic inorganic acid salt which crosslinks said polymer by hydrogen-bonding complexation said salt comprising alkali metal borate, (c) foaming agent to impart persistence to the fluid air foam generated upon aeration of said solution or dispersion, (d) pH modifier to impart an appropriate pH to said solution or dispersion necessary for time-controlled formation of gelled or viscous foam from said fluid air foam, and (e) water as the major component by weight;
   (2) aerating said aqueous solution or dispersion to form an aqueous fluid air foam therefrom; and
   (3) applying said fluid air foam to exposed surface of said substrate, the resulting applied foam forming a gelled, aqueous air foam or viscous, aqueous air foam in the form of a highly vapor-impermeable coating on said surface.

2. The method of claim 1, wherein said polymer is a polysaccharide containing cis 1,2-diol structures.

3. The method of claim 2 wherein said polymer is galactomannan gum.

4. The method of claim 2 wherein said polymer is guar gum.

5. The method of claim 2 wherein said polymer is a guar gum derivative.

6. The method of claim 2 wherein said polymer is a hydroxypropyl guar gum derivative.

7. The method of claim 1 wherein said polymer is poly(vinyl alcohol).

8. The method of claim 1, wherein said polyprotic inorganic acid salt is borax.

9. The method of claim 1 wherein said aqueous solution or dispersion further comprises fire retardant.

10. The method of claim 1 wherein said aqueous solution or dispersion further comprises rubber or polymeric latices.

11. A method of treating a substrate with aqueous air foam, comprising the steps of
   (1) preparing an aqueous solution or dispersion comprising (a) guar gum or hydroxypropyl guar gum derivative, (b) borax, (c) foaming agent, (d) alkaline pH modifier, and (e) water as the major component by weight;
   (2) aerating said aqueous solution or dispersion to form an aqueous fluid air foam therefrom; and
   (3) applying said fluid air foam to exposed surface of said substrate, the resulting foam forming, at least 5 seconds after its formation, a gelled, aqueous air foam in the form of a highly vapor impermeable coating on said surface.

12. The method of claim 11, wherein the amount of gum is 0.2 to 2 weight percent, the amount of borax is sufficient to provide a borax:gum weight ratio of 1:20 to 1:1, and the amount of pH modifier is sufficient to provide a pH of about 9 to 10.5, said pH modifier being NaOH, $Na_2CO_3$, or $NH_4OH$.

13. The method of claim 11, further comprising the step of contacting said gelled air foam coating with a dilute aqueous acid solution to collapse said coating.

14. A method of treating a substrate with aqueous air foam, comprising the steps of
   (1) preparing an aqueous solution or dispersion comprising (a) water-soluble poly(vinyl alcohol) capable of complexation with borate anion, (b) borax, (c) foaming agent, (d) pH modifier, and (e) water as the major component by weight;
   (2) aerating said aqueous solution or dispersion to form an aqueous fluid air foam therefrom; and
   (3) applying said fluid air foam to exposed surface of said substrate.

15. The method of claim 2, wherein said substrate is a body of hazardous material or waste.

16. The method of claim 15, wherein said substrate is a body of flammable liquid.

17. The method of claim 15, wherein said substrate is a body of combustible material.

18. The method of claim 17 wherein said combustible material is wooden structures of vegetation.

19. A method according to claim 2 wherein the fluid air foam, at least 30 seconds after its formation, forms a gelled or viscous aqueous air foam in the form of a highly vapor impermeable coating on said surface.

20. A method according to claim 2 wherein the fluid air foam, at least 60 seconds after its formation, forms a gelled or viscous air foam in the form of a highly vapor impermeable coating on said surface.

21. A method according to claim 2 wherein the fluid air foam, at least 20 minutes after its formation, forms a gelled or viscous air foam in the form of a highly vapor impermeable coating on said surface.

* * * * *

UNITED STATES PATENT AND TRADEMARK OFFICE
CERTIFICATE OF CORRECTION

PATENT NO. : 5,026,735

DATED : JUNE 25. 1991

INVENTOR(S) : RICHARD M. STERN

It is certified that error appears in the above-identified patent and that said Letters Patent is hereby corrected as shown below:

Col. 7, line 1-2, "Sulfosuccinic" should be --sulfosuccinic--.
Col. 18, line 38, "claim 2" should be --claim 1--.
Col. 18, line 46, "claim 2" should be --claim 1--.
Col. 18, line 50, "claim 2" should be --claim 1--.
Col. 18, line 54, "claim 2" should be --claim 1--.

Signed and Sealed this

Sixteenth Day of March, 1993

Attest:

STEPHEN G. KUNIN

*Attesting Officer*  *Acting Commissioner of Patents and Trademarks*

UNITED STATES PATENT AND TRADEMARK OFFICE
CERTIFICATE OF CORRECTION

PATENT NO. : 5,026,735
DATED : June 25, 1991
INVENTOR(S) : Stern

It is certified that error appears in the above-indentified patent and that said Letters Patent is hereby corrected as shown below:

Col. 16, line 19, Before "wt %" insert --25--.

Signed and Sealed this

Second Day of May, 1995

Attest:

BRUCE LEHMAN

Attesting Officer     Commissioner of Patents and Trademarks